Inventors:
Charles C. Clymer,
Gabriel Kron,
Charles Concordia,
by Harry E. Dunham
Their Attorney.

May 26, 1942.  C. C. CLYMER ET AL  2,284,469
ALTERNATING CURRENT MOTOR DRIVE
Filed Sept. 20, 1941  2 Sheets—Sheet 2

Inventors:
Charles C. Clymer,
Gabriel Kron,
Charles Concordia,
by Harry E. Dunham
Their Attorney.

Patented May 26, 1942

2,284,469

UNITED STATES PATENT OFFICE 2,284,469

ALTERNATING CURRENT MOTOR DRIVE

Charles C. Clymer, Altamont, and Gabriel Kron and Charles Concordia, Schenectady, N. Y., assignors to General Electric Company, a corporation of New York Application September 20, 1941, Serial No. 411,608

5 Claims. (Cl. 172—274)

Our invention relates to alternating current motor drives where two or more alternating current motors of the induction type fed from the same supply line have their secondary windings connected to the same synchronous machine for speed and load control purposes, and its object is to eliminate undesirable hunting between the loads of the induction machines. To accomplish this result we prefer to connect the secondaries of the induction machines in series relation with the synchronous machine.

Figure 1:
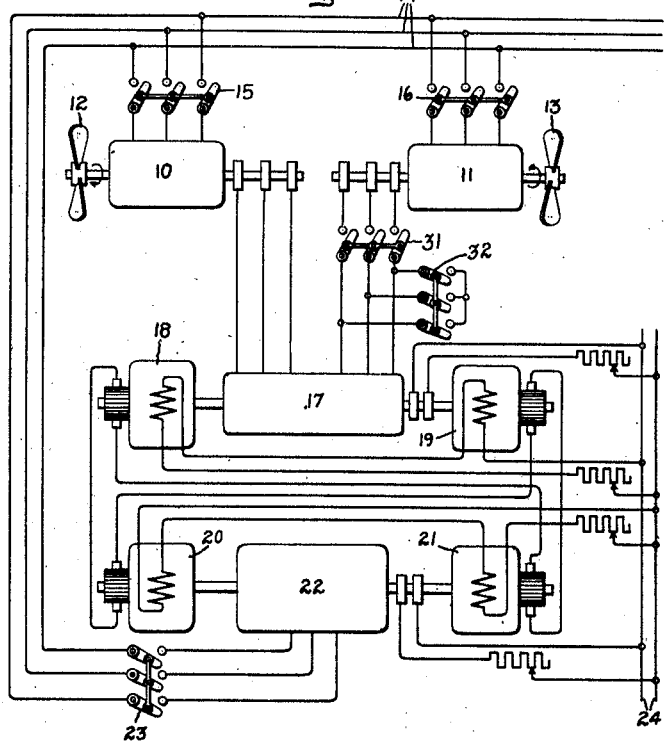
Figure 2:
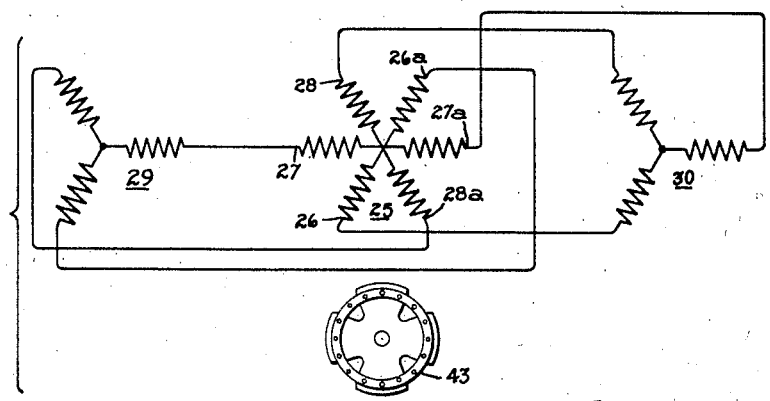
Figure 3:
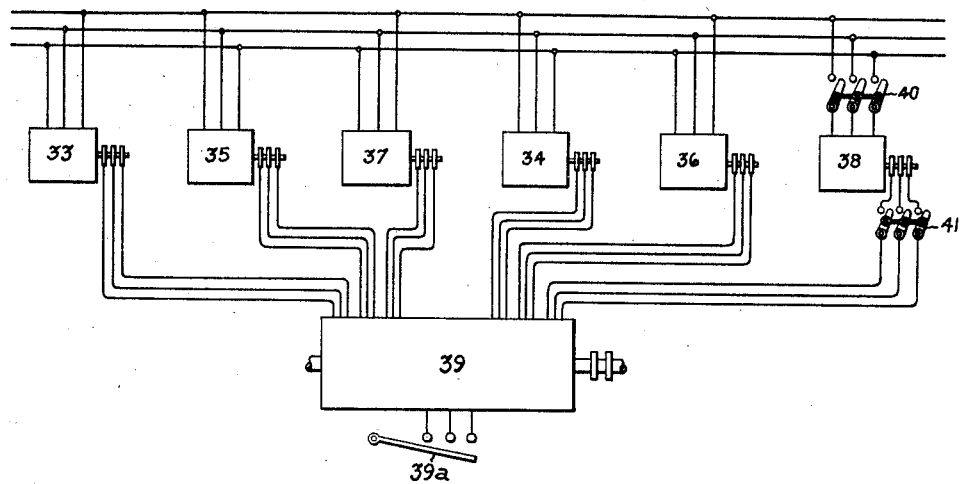
Figure 4:
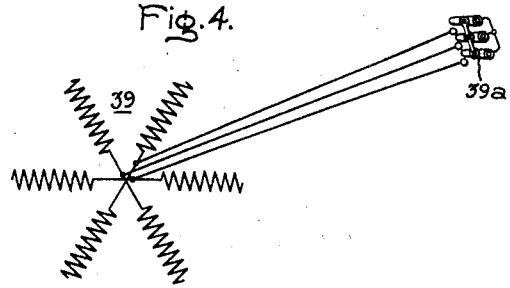

The features of our invention which are believed to be novel and patentable will be pointed out in the claims appended hereto. For a better understanding of our invention reference is made in the following description to the accompanying drawings in which Fig. 1 represents a wind tunnel fan drive using two induction motor driven fans together with load control apparatus connected to the secondary circuits of the induction motors. Fig. 2 shows the series connections of the two induction machines with the regulating synchronous machine. Fig. 3 illustrates an expansion of the system of Fig. 1, and Fig. 4 shows how the synchronous exciter may be adapted for operation with an odd number of motors.

In Fig. 1, 10 and 11 represent induction motors for driving fans 12 and 13 in the same wind tunnel. In such an arrangement where fans are spaced along a wind tunnel for forcing air in the same direction, it is preferable that the fans rotate in opposite directions in order that any tendency of one fan to give a sidewise component to the wind stream is counteracted by the other. Accordingly, it is assumed that the fan motors have their primary windings connected to the supply line 14 for rotation in opposite directions. This requires the use of fans with oppositely pitched blades. 15 and 16 represent switches between the primary winding of the induction motors and the three-phase power supply line 14.

Control apparatus is provided connected to the secondary windings of the induction machines to vary the speed and load of the motors. Preferably such control apparatus is of a type which permits the energy given out from the secondaries of the induction motors during starting and during normal operation to be returned to the supply lines 14 and also of a type that maintains good power factor on the induction motors. For such purposes the secondaries of the induction motors are connected to a synchronous machine 17 which will normally act as a synchronous motor and which drives direct current generators 18 and 19. The direct current load of these generators is supplied to direct current motors 20 and 21 connected to drive a synchronous generator 22 which feeds its energy back to line 14 through a circuit in which a switch 23 is connected. The synchronous machine will as usual be provided with an amortisseur winding on its rotor as represented at 43, Fig. 2. Such control apparatus other than the structure and connections of the synchronous machine 17 is not new. The set comprising machines 20, 21 and 22 runs at a constant speed determined by the frequency of supply line 14 to which the synchronous machine 22 is connected. The set comprising machines 17, 18 and 19 may have its speed adjusted over wide limits such that the frequency of synchronous machine 17 may be varied to correspond to the secondary slip frequencies of induction motors 10 and 11 for various motor speeds and loads between standstill and nearly synchronous speed. Such speed and load control is provided by adjustment of the field windings of the various direct current machines supplied from a direct current source 24. Power factor control of the A. C. system is provided by adjustment of the field windings of synchronous machines 17 and 22 which field windings are also supplied from direct current source 24.

The induction machines 10 and 11 have their secondary windings supplied with alternating current excitation from synchronous machine 17 and hence operate in effect as synchronous machines. If their secondaries were connected in parallel to synchronous machine 17 the possibility of serious load hunting between the two induction machines would arise. That is, motor 10 might take more load than motor 11 at one moment bringing about a condition tending to shift load to motor 11 and then back again. The reason for this is that when such induction motors are connected in parallel on both primaries and secondaries, as would be the case here assumed, the damping of such load oscillations is negative at all motor speeds except at a very small slip and unless the damping afforded by the driven loads be very large the load oscillations above referred to will occur particularly at speeds where full load may occur.

According to our invention synchronous machine 17 is provided with an alternating current winding with its phases separate and each phase has its two ends brought out to terminals as represented at 25 in Fig. 2 where 26 and 26a represent the terminals of one phase, 27 and 27a the terminals of another phase, and 28 and 28a the terminals of the remaining phase. 29 and 30 represent the secondary windings of the induction motors 10 and 11. With this connection the currents in the secondary (rotor) windings of the two induction motors must be the same, so that negligible rotor currents will be induced by oscillations against each other of the two induction motors, and thus the possibility of hunting of the two motors against each other is eliminated. Moreover, for oscillations of the two induction motors together and in phase, the damping afforded by the winding 25 is effective just as in the case of the parallel secondary connection. The load oscillation hunting possibilities are therefore eliminated. The stator winding of synchronous machine 17 will be wound for double the voltage as compared to the normal arrangement. However, the voltage to ground is no greater than heretofore.

In case it becomes desirable to operate only one of the induction motors, for example the motor 10, motor 11 may be disconnected by switches represented at 16 and 31 and the three phases of the stator winding 25 of the machine 17 connected together at one end as by a switch 32.

In cases where the reduction in the synchronizing torque (and thus in the allowable load difference) between the two motors caused by the series rotor connection cannot be tolerated, and/or where the negative damping need not be quite so effectively eliminated as by the series connection, operation of the two induction motor rotors from separate windings on the synchronous machine will provide a good means of obtaining satisfactory performance. It will be evident that merely connecting together the midpoints of the three windings 25 in Fig. 2 produces one arrangement which is in effect two such separate windings. Fig. 4 shows one way of doing this. The two separated windings may be nearly in phase, as in a conventional double winding alternator. Depending on the required synchronizing power and damping between the motors, the windings can be arranged by well known means to provide the optimum amount of mutual coupling. In any case the windings of the synchronous machine will be brought out to separate sets of polyphase winding terminals to be individually connected to the different induction motor secondaries to avoid parallel connections and obtain the damping afforded by the synchronous machine.

In Fig. 3 we have represented the invention as applied to a drive having six induction motors numbered 33 to 38, inclusive, all supplied with alternating current excitation from the synchronous machine 39, which corresponds to machine 17 in Fig. 1. Machine 39 will have three sets of separate phase windings on it like the winding 25, Fig. 2. If now the secondaries of motors 33 and 34 be connected in series with one of these windings, we will have a system similar to that described in Fig. 1. Motors 35 and 36 may have their secondaries connected in series with another winding on machine 39 like that at 25 in Fig. 2. Also, motors 37 and 38 may have their secondaries connected in series with the third winding on machine 39. In such an arrangement the circuit which includes the secondaries of machines 33 and 34 is separate from that through the secondaries of machines 35 and 36, etc., so that it might be assumed that load oscillation changes would occur between those motors which are included in separate series secondary circuits. Such is not the case, however, because the hunting tendency is considerably weakened unless both the primaries and secondaries of any pair of induction motors be connected in parallel, and enough load damping to compensate it will in general exist.

In an arrangement such as shown in Fig. 3 involving more than two pairs of motors and more than one set of windings on machine 39 it may be desirable to provide means for obtaining suitable excitation for an odd number of motors greater than one such as three or five. This may be done by bringing out taps from the centers of the different phases of one of the windings to a short circuiting switch 39 as represented in Fig. 4. If, now, it is desired to operate, say motors 33 to 37 only, motors 33 and 34 with secondaries in series and motors 35 and 36 with secondaries in series would be left connected as previously described. Motor 37 would remain connected to the winding shown in Fig. 4, switch 39a would be closed and motor 38 would have its primary and secondary disconnected by switches at 40 and 41. The active half of the winding of Fig. 4 will now supply the same voltage to the secondary of motor 37 as is available for the secondaries of the other connected motors. The other half of the winding of Fig. 4 while it will have a voltage induced in it will be open at switch 41 and hence will be inactive.

From the description given it will be evident to those skilled in the art that any number of motors from one to six may be operated in Fig. 3 without danger of load oscillations between them and that the load and speed may be changed by varying the speed of machine 39 as described for machine 17 of Fig. 1.

In the above discussion it has been assumed that the induction motors of a given installation have the same rating.

What we claim as new and desire to secure by Letters Patent of the United States is:

1. A motor drive system including two alternating current motors having primary windings connected in parallel to a common source of supply, and having wound secondary polyphase windings, a synchronous dynamo electric machine having an alternating current polyphase winding connected in series with the secondary windings of the induction machines, the different phases of the polyphase winding of the synchronous dynamo electric machine being separated, and means for varying the speed of said synchronous machine to similarly control the induction machines.

2. A motor drive system including two alternating current motors, having primary windings adapted to be connected in parallel to a source of supply, and having wound secondary polyphase windings, a variable speed synchronous dynamo electric machine having a polyphase winding connected in series relation with the secondary windings of said induction machines, the different phases of the synchronous machine winding being separated, and switching means for disconnecting one of said motors from its source of supply and connecting the corresponding terminals of the polyphase winding of the synchronous machine together.

3. A motor drive system comprising a plurality of pairs of alternating current motors having primary windings connected in parallel to a source of supply, and having wound polyphase secondary windings, a variable speed synchronous dynamo electric machine having a plurality of separate polyphase alternating current windings with the phases of each such winding separated, and means for connecting the secondary windings of different pairs of motors in series with different polyphase windings of said synchronous machine.

4. A motor drive system comprising a plurality of alternating current motors having primary windings adapted to be connected in parallel to a common source of supply, said motors having wound secondary polyphase windings, a single synchronous machine having separate polyphase windings and polyphase winding terminals brought out from opposite ends of such polyphase windings for connection to the several motor secondary windings whereby by varying the speed of the synchronous machine it may be used to regulate all of said induction motors simultaneously, each of the polyphase windings on the synchronous machine having their phases separated and at least one of the polyphase windings of the synchronous machine having connections brought out from the center of its phases for the purpose of connecting said phases together.

5. A plurality of induction motors having polyphase primary and secondary windings, a source of polyphase power supply, means for connecting the primary windings of said induction machines in parallel to said source of supply, a synchronous dynamo electric machine having polyphase windings for simultaneously supplying excitation to the secondary windings of said induction machines, the synchronous machine having a plurality of separated sets of polyphase winding terminals individually connected to different induction motor secondary windings whereby parallel connections between the secondary windings of said induction machine are avoided and hunting tendency between different induction motors is opposed by the damping afforded by said synchronous machine.

CHARLES C. CLYMER.
GABRIEL KRON.
CHARLES CONCORDIA.